United States Patent
Hosokawa

(10) Patent No.: US 7,311,311 B2
(45) Date of Patent: Dec. 25, 2007

(54) SEAL

(75) Inventor: Atsushi Hosokawa, Arida (JP)

(73) Assignee: Mitsubishi Cable Industries, Ltd., Tokyo (JP)

( * ) Notice: Subject to any disclaimer, the term of this patent is extended or adjusted under 35 U.S.C. 154(b) by 0 days.

(21) Appl. No.: 11/235,180

(22) Filed: Sep. 27, 2005

(65) Prior Publication Data

US 2006/0066061 A1 Mar. 30, 2006

(30) Foreign Application Priority Data

Sep. 28, 2004 (JP) .............................. 2004-282303

(51) Int. Cl.
*F16J 15/02* (2006.01)
(52) U.S. Cl. ..................... 277/641; 277/642; 277/643; 277/649
(58) Field of Classification Search ........ 277/641–643, 277/649
See application file for complete search history.

(56) References Cited

U.S. PATENT DOCUMENTS

| | | | | |
|---|---|---|---|---|
| 2,687,909 A | * | 8/1954 | Blackman et al. ........... | 277/651 |
| 2,722,043 A | * | 11/1955 | Nenzell ...................... | 49/479.1 |
| 2,764,311 A | * | 9/1956 | Blackman ................... | 277/641 |
| 4,428,590 A | * | 1/1984 | Pippert et al. .............. | 277/638 |
| 4,699,293 A | * | 10/1987 | Duchrow ..................... | 220/378 |
| 4,828,274 A | * | 5/1989 | Stannard ..................... | 277/641 |
| 5,104,286 A | * | 4/1992 | Donlan ....................... | 415/170.1 |
| 6,196,552 B1 | * | 3/2001 | Peterson et al. ............ | 277/437 |
| 6,338,492 B1 | * | 1/2002 | Schilling et al. ........... | 277/630 |
| 6,505,839 B1 | * | 1/2003 | Nishimuro et al. ......... | 277/628 |
| 7,159,874 B2 | * | 1/2007 | Hosokawa ................... | 277/651 |
| 2004/0036233 A1 | * | 2/2004 | Schleth et al. .............. | 277/641 |
| 2006/0269818 A1 | * | 11/2006 | Inoue et al. ................. | 429/35 |

* cited by examiner

*Primary Examiner*—Alison K Pickard
(74) *Attorney, Agent, or Firm*—Wenderoth, Lind & Ponack, L.L.P.

(57) ABSTRACT

A seal rubber 3 is placed in a first peripheral groove 2 formed in one main surface 1A of an approximately flat-plate-shaped metal body 1. A second peripheral groove 4 and multiple communicating holes 5 to communicate between the second peripheral groove 4 and the first peripheral groove 2 are formed in the other main surface 1B of the metal body 1. A retaining rubber 6 disposed in the second peripheral groove 4, the seal rubber 3, and a bridge rubber 7 disposed in the communicating hole 5 are integrated. The first peripheral groove 2 is made to be a dovetail groove, the second peripheral groove 4 is made to have an inner surface inclined to reduce the groove width from a groove opening side to a groove bottom surface side, and the groove width D4-2 of the groove bottom surface and the inner diameter D3 of the communicating hole 5 are made to be substantially the same. As a result, release or breakage of the seal rubber does not occur during opening or closing of the two members, stable seal performance is achieved, and even when a large seal is to be made, the seal rubber can be attached easily.

9 Claims, 8 Drawing Sheets

(a)

(b)

SEAL

FIELD OF THE INVENTION

The present invention relates to a seal comprising a seal rubber and a metal body, which is attached to one of two members, which combinedly show a make-and-break action, for hermetically closing a gap between the two members by allowing the seal rubber to be pressed against the other member when the two members are at a making position. More particularly, the present invention relates to a seal particularly preferable as a gate seal capable of maintaining stable sealing performance for a long time, wherein the seal rubber is not easily detached from the metal body and hardly gets broken.

BACKGROUND OF THE INVENTION

Conventionally, seals having a structure wherein an O-ring, which is a seal rubber, is mounted in a dovetail groove formed on a valve element are known for seal structures of chamber gate parts of semiconductor manufacturing equipment, liquid crystal manufacturing equipment and the like, namely, an open-close part (valve element and valve seat) of a chamber. This aims at preventing the O-ring from becoming loose or falling from the dovetail groove when a valve element and a valve seat are opened and a seal rubber (O-ring) is exposed, and preventing the O-ring from occupying an inappropriate position or place when the lid and the like are closed again (e.g., JP-A-2003-14126).

In recent years, however, along with the scaling up of liquid crystal panels, semiconductor wafers and the like, these kinds of seals have been also scaled up, and placing of seal rubbers in the dovetail grooves has become complicated. In addition, when the valve element and the valve seat are closed for a long time, the seal lip (protruding part of the tip) of the seal rubber is agglutinated with the matching valve seat, which problematically causes falling from the seal rubber from the dovetail groove upon opening.

The present inventor previously proposed a seal structure wherein a seal rubber is placed in a peripheral groove formed in the main surface of a metal body (JP-A-2-253063). This seal has a structure as shown in FIG. 7-FIG. 9, wherein a peripheral groove 11 having an approximately rectangular cross sectional shape is formed in one surface of a ring retainer (metal body) 10 having an approximately rectangular sectional shape, a seal rubber 12 is placed in the peripheral groove 11, counterbores 14 are formed at plural positions on the opposite surface 17, communicating holes 13 communicating each counterbore 14 and the peripheral groove 11 are formed, a retaining rubber 15 is set in each counterbore 14, and each retaining rubber 15 and seal rubber 12 are integrated by a bridge rubber 16 placed in the communicating hole 13, whereby the seal rubber 12 is fixed in the peripheral groove 11. This seal is used as a gasket, rather than being set on one side of two members capable of an open-close movement like the above-mentioned gate seal, and by physically pressing the seal against the matching member, leakage of the object liquid to be sealed is prevented.

The present inventor considered that the seal described in the aforementioned reference (JP-A-2-253063) had a structure that did not permit easy removal of the seal rubber from the groove of the metal body, and therefore, it could be applicable to a gate seal and tried the application. However, when the valve element and the valve seat in the gate seal were closed for a long time, and the seal lip (protruding part of the tip) of the seal rubber was agglutinated with the matching valve seat, a bridge rubber communicating the seal rubber and the retaining rubber problematically got broken upon opening, as mentioned above.

In view of the above-mentioned situation, the problem to be solved by the present invention is to provide a seal which is attached to one member of combinedly openable-closable two members and hermetically seals the gap between the two members by a seal rubber thereof to be pressed to the other member when the two members are closed, wherein, even when the seal rubber is agglutinated with the matching member (the other member), the seal rubber is not removed from the dovetail groove and does not get broken by the opening motion, but can be separated from the matching member, stable seal performance can be obtained for a long time, and even when a large seal is to be formed, a seal rubber can be easily placed in a dovetail groove, particularly, to provide a seal preferable as a gate seal for a chamber gate of semiconductor manufacturing equipment, liquid crystal manufacturing equipment and the like.

SUMMARY OF THE INVENTION

To solve the above-mentioned problem, the present invention has the following characteristics.

(1) A seal having a seal rubber, which seal is to be set on one of two openable-closable members to hermetically seal a gap between the two members with the seal rubber pressed against the other member when the two members are closed, the seal comprising;

an approximately flat-plate-shaped metal body comprising a first peripheral groove in one main surface thereof and a seal rubber therein, a second peripheral groove in the other main surface thereof, and multiple communicating holes to communicate the second peripheral groove and the first peripheral groove, the second peripheral groove comprising a retaining rubber disposed therein, where the retaining rubber and the seal rubber are integrated with bridge rubbers disposed in the multiple communicating holes, wherein the first peripheral groove is a dovetail groove, the second peripheral groove has an inner surface inclined to reduce the groove width from a groove opening side to a groove bottom surface side, the groove width of the groove bottom surface and the inner diameter of the communicating hole are substantially the same, and the seal rubber is mounted in the first peripheral groove to fill almost the whole area of the groove.

(2) A seal having a seal rubber, which seal is to be set on one of two openable-closable members to hermetically seal a gap between the two members with the seal rubber pressed against the other member when the two members are closed, the seal comprising;

an approximately flat-plate-shaped metal body comprising a first peripheral groove in one main surface thereof and a seal rubber therein, a second peripheral groove in the other main surface thereof, and multiple communicating holes to communicate the second peripheral groove and the first peripheral groove, the second peripheral groove comprising a retaining rubber disposed therein, where the retaining rubber and the seal rubber are integrated with bridge rubbers disposed in the multiple communicating holes, wherein the first peripheral groove is a multistage groove comprising a dovetail groove at least as the lowest bottom groove, the second peripheral groove has an inner surface inclined to reduce the groove width from a groove opening side to a groove bottom surface side, the groove width of the groove bottom surface and the inner diameter of the communicating hole are substantially the same, and the seal rubber is mounted in the first peripheral groove to fill almost the whole area of the groove.

(3) The seal of the aforementioned (2), wherein the multistage groove is a two-tiered groove.

(4) The seal of the aforementioned (3), wherein the two-tiered groove is a dovetail groove.

(5) The seal of the aforementioned (1), wherein the dovetail groove has a trapezoid cross sectional shape.

(6) The seal of the aforementioned (1), wherein the seal rubber, the retaining rubber and the bridge rubber are integrally formed as a molded product made of a single rubber by injecting a rubber material to the second peripheral groove, the communicating hole and the first peripheral groove from the second peripheral groove of the metal body as an inlet.

(7) The seal of the aforementioned (1), wherein the seal rubber, the retaining rubber and the bridge rubber are made of a fluorine rubber material.

(8) The seal of the aforementioned (1), wherein the main surface of the approximately flat-plate-shaped metal body has a shape of a rectangle or square having four curved corners, the first and the second peripheral grooves each comprise a linear groove along the linear side of the main surface of the metal body, and a curved groove along the curved side thereof, and the formation pitch of the communicating holes to communicate linear grooves in the first and the second peripheral grooves is smaller than the formation pitch of the communicating holes to communicate curved grooves in the first and the second peripheral grooves.

(9) The seal of the aforementioned (1), which is used as a gate seal in a chamber gate for semiconductor manufacturing equipment and liquid crystal manufacturing equipment.

DETAILED DESCRIPTION OF THE INVENTION

According to the present invention, a seal rubber fills almost the entire area in a first peripheral groove having a dovetail groove formed on one main surface of a metal body. Therefore, even when the seal rubber is agglutinated with a matching member while two openable-closable members are closed, the seal rubber can be separated from the matching member without being released from the dovetail groove when the openable-closable members are opened. In addition, even when a load from repeated open-close actions of the openable-closable members is applied, a rubber molded product including the seal rubber does not become broken, and superior seal performance can be maintained for a long time.

In addition, a seal rubber is placed in the first peripheral groove by injecting a rubber material into a second peripheral groove, a communicating hole and the first peripheral groove from, as an inlet, the second peripheral groove for mounting a retaining rubber, which is formed in the other main surface of the metal body, and molding the rubber material to provide a single rubber molded product integrating the seal rubber, a bridge rubber and the retaining rubber connecting them. Thus, a seal rubber can be set comparatively easily in the first peripheral groove having a dovetail groove, even when a large seal is to be formed or when the shape of the dovetail groove of the first peripheral groove is complicated.

In the seal of the present invention, moreover, the first peripheral groove consists of a multistage groove wherein at least the lowest bottom groove is a dovetail groove. Consequently, release of the seal rubber from the first peripheral groove, deformation of the seal rubber and the like can be suppressed at a higher level and the depth of the whole groove can be increased. The seal rubber to be placed in the first peripheral groove is rich in rubber elasticity and shows superior adhesiveness to the matching member, which enables provision of a seal that exhibits superior seal performance for an extended period of time.

Figure 4:
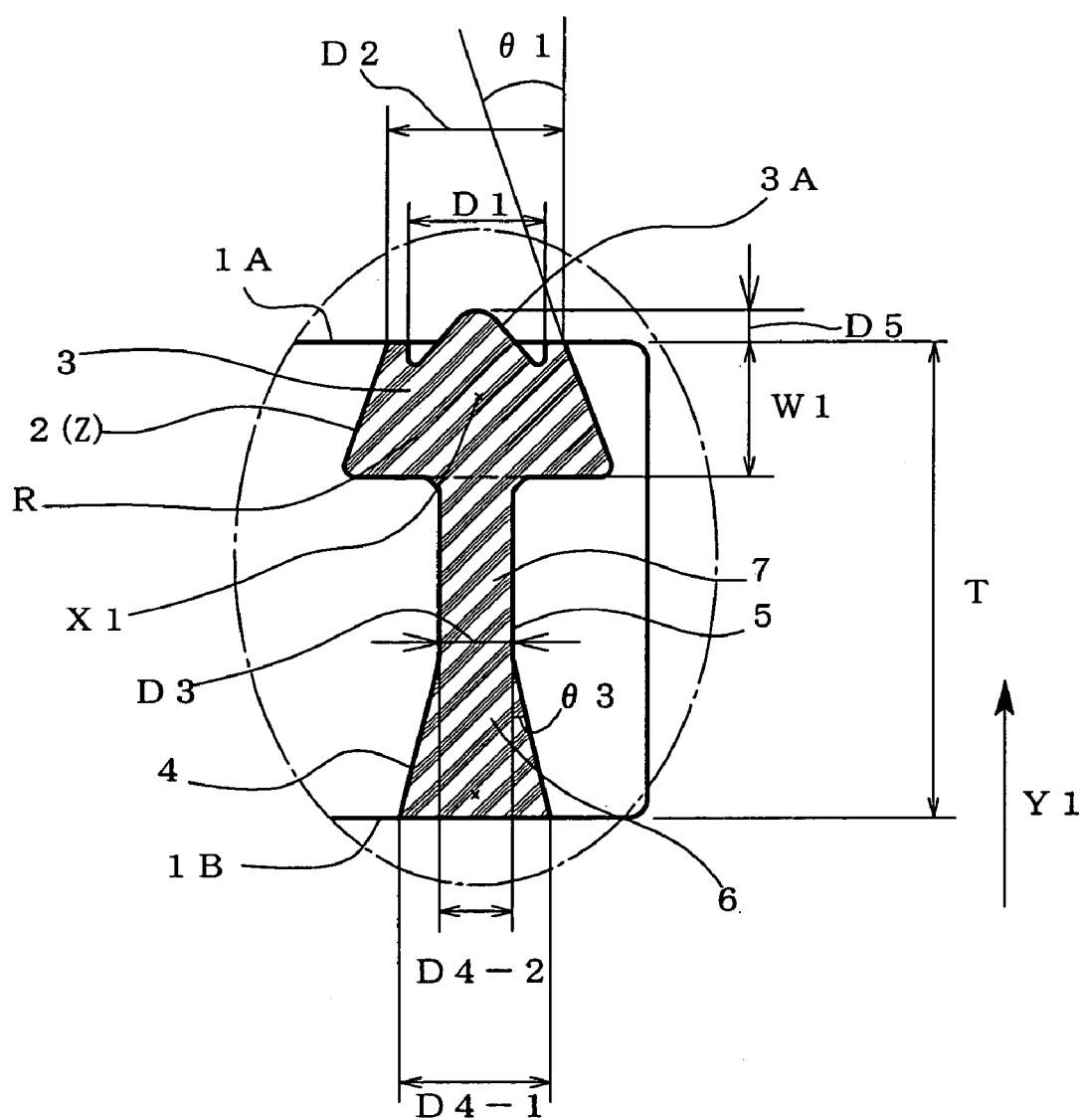
FIG. 4 is an enlarged view of the part encircled with a dashed line in FIG. 3.

In the present invention, the term "dovetail groove" refers to a groove having a smaller width of the groove opening than that of the inside of the groove, so that the seal rubber in the groove does not easily become released from the groove. The cross sectional shape of the dovetail groove (shape of the section of the groove perpendicularly cut in the longitudinal direction) is not limited as long as the width of the groove opening is smaller than the width of the inside of the groove. For example, it may be a shape wherein the width of the groove continuously decreases from the inside of the groove to the opening of the groove, such as a simple trapezoidal shape as shown in FIG. 4, and a shape wherein the width of the groove stepwisely decreases from the inside of the groove to the opening of the groove. The dovetail groove shown in FIG. 6 has a structure of vertically double-layered grooves, where the width of the groove opening is smaller than that of the inside of the groove, when taking note of the groove 2*a* alone.

The present invention is explained in more detail in the following with reference to the drawings.

Figure 1:
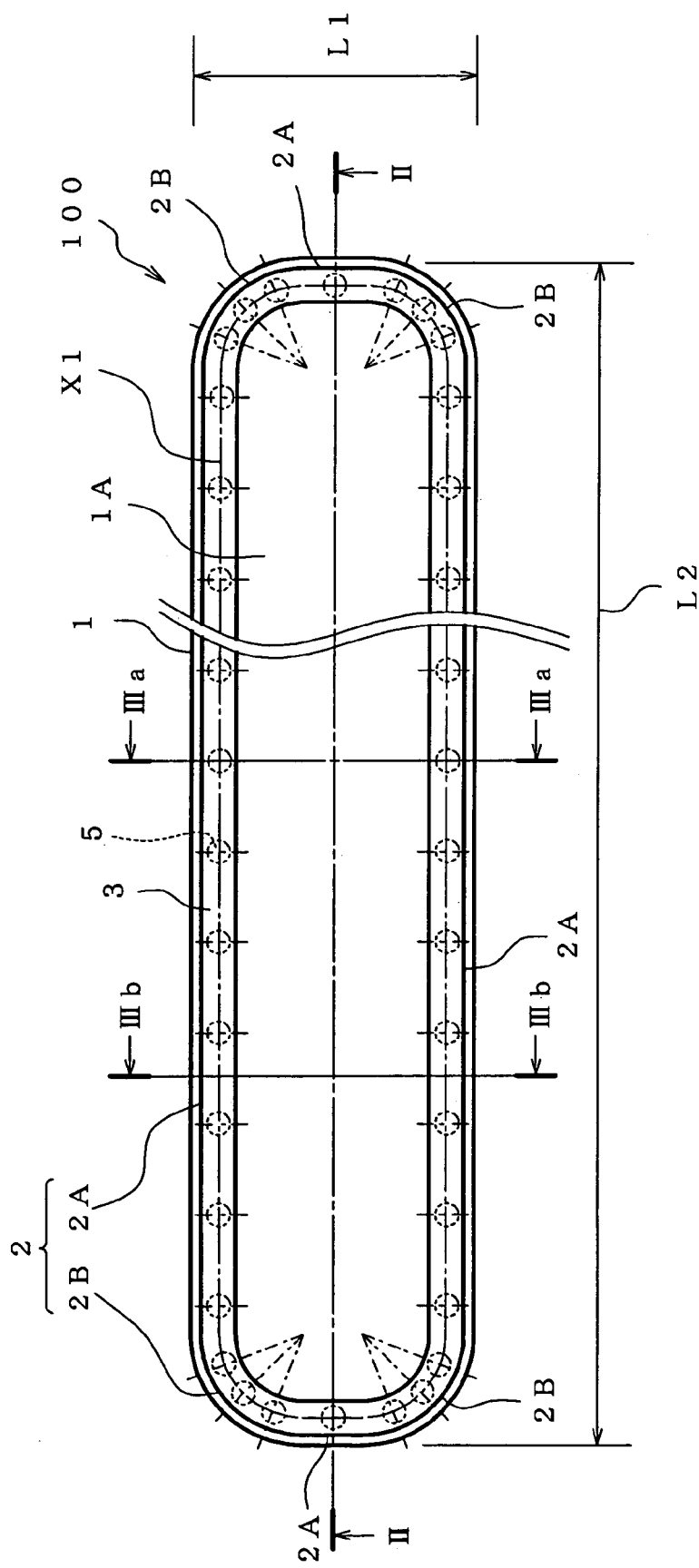
FIG. 1 is a plan view of a seal rubber side of a seal of a first embodiment of the present invention.
Figure 2:
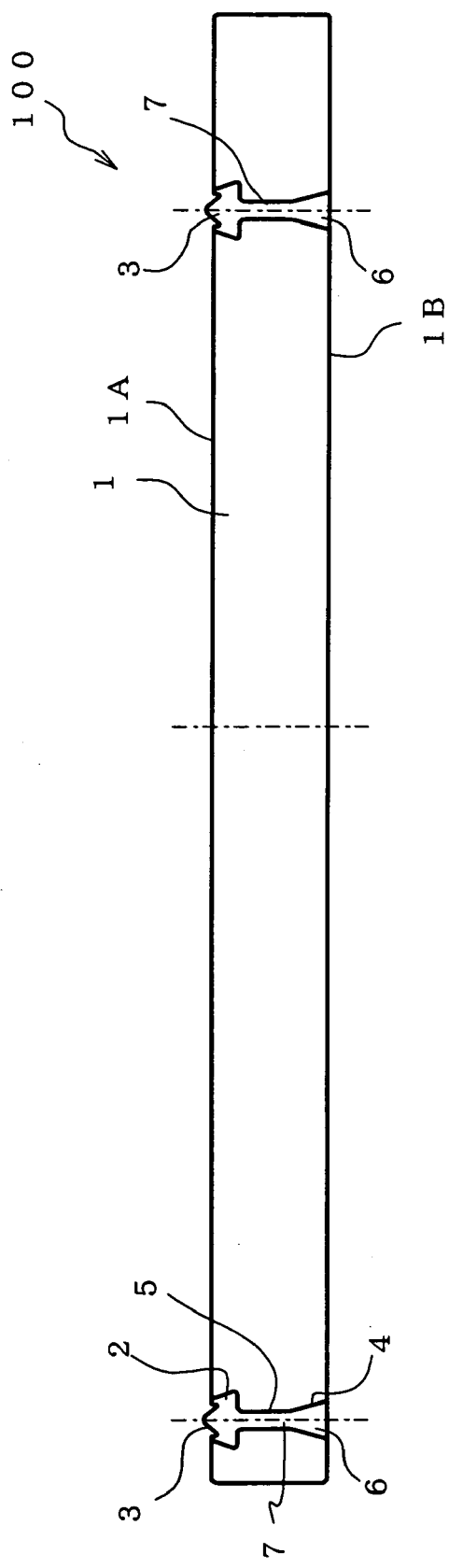
FIG. 2 is a sectional view along line II-II in FIG. 1.
Figure 3:
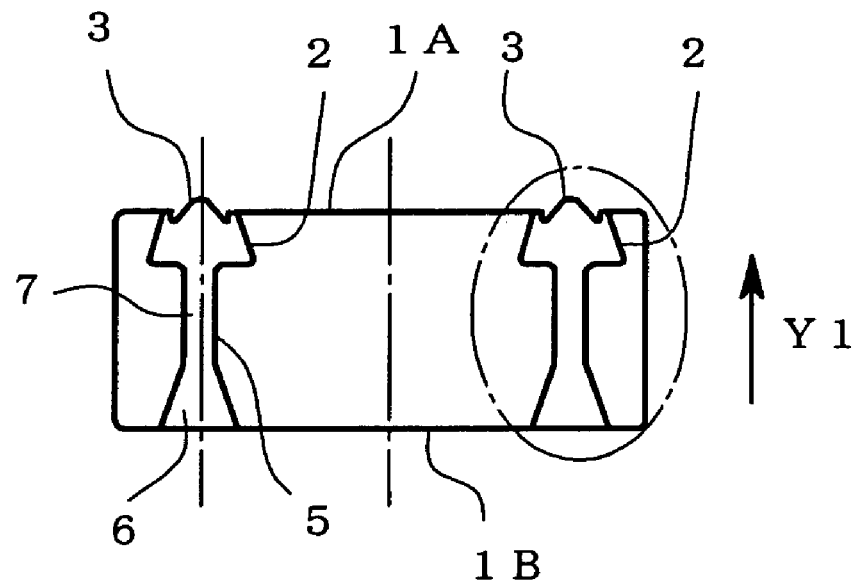
FIGS. 3(*a*) and (*b*) are sectional views along lines IIIa-IIIa and IIIb-IIIb, respectively, in FIG. 1.
Figure 3:
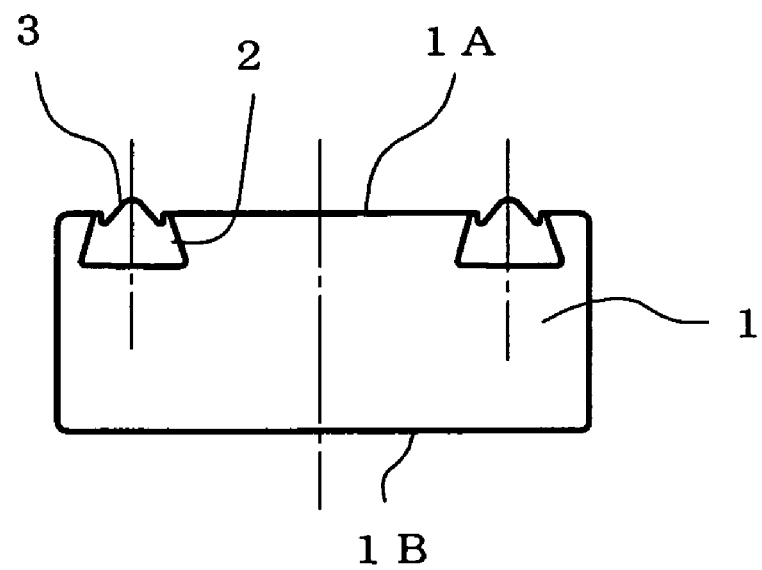
Figure 5:
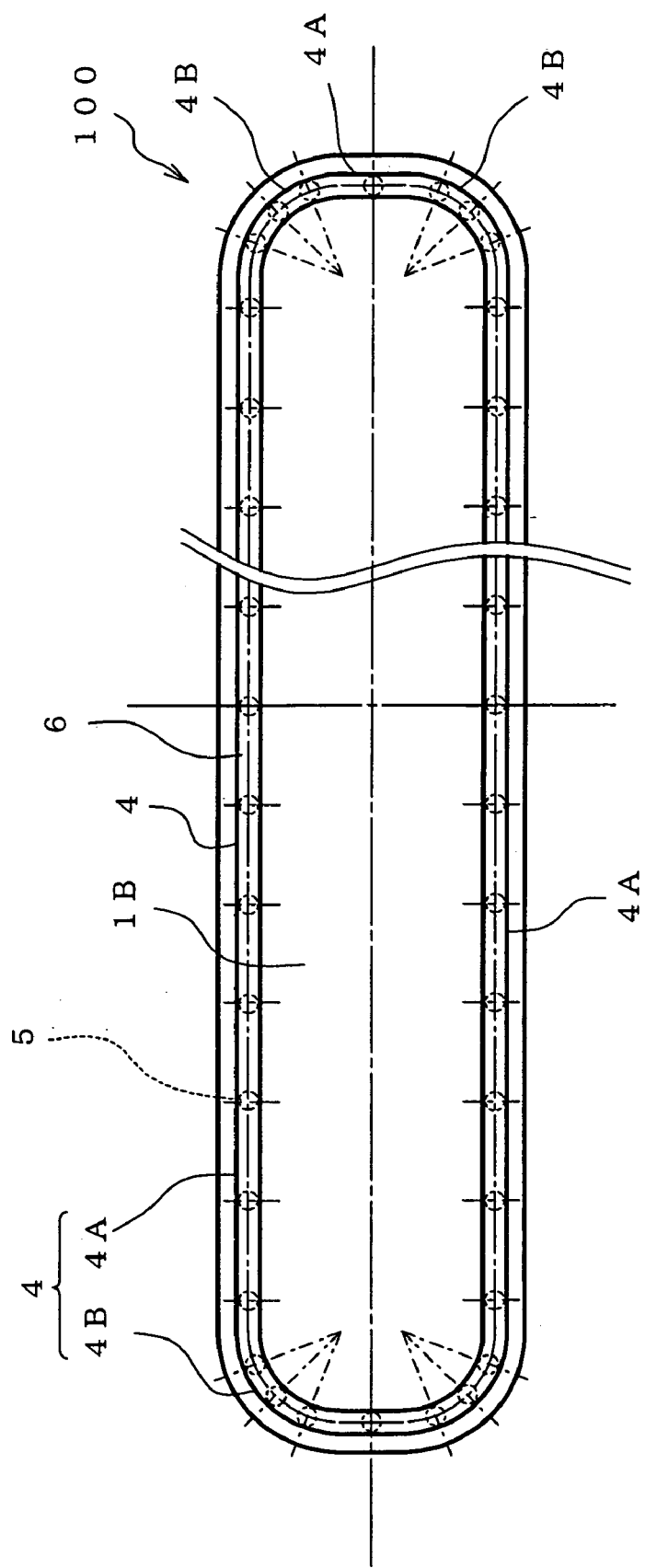
FIG. 5 is a plan view of a retaining rubber side of the seal of the first embodiment of the present invention.

FIGS. 1-5 show a first embodiment of the seal of the present invention, wherein FIGS. 1 and 5 are plan views, FIG. 2 is a sectional view along line II-II in FIG. 1, FIG. 3(*a*) is a sectional view along line IIIa-IIIa in FIG. 1, FIG. 3(*b*) is a sectional view along line IIIb-IIIb in FIG. 1, and FIG. 4 is an enlarged view of the substantial parts in FIG. 3(*a*) (encircled with a dashed line). FIG. 1 is a plan view of a seal rubber on the mounting side, and FIG. 5 is a plan view of a seal rubber on the retaining rubber.

In the seal of the present invention, as shown in a seal 100 in the embodiment, a peripheral groove (first peripheral groove) 2 is formed on one main surface 1A of an approximately flat-plate-shaped metal body (valve element) 1, and a seal rubber 3 is placed in the peripheral groove 2. The seal is attached to one member (not shown) of the openable-closable members and used to hermetically seal the gap between the two members by pressing the seal rubber 3 against the other member (not shown) when the two members are closed.

In the seal of the present invention, the approximately flat-plate-shaped metal body 1 also has a peripheral groove (second peripheral groove) 4 on the other main surface (hereinafter to be also referred to as a "second main surface") 1B, which is on the back of the one main surface (hereinafter to be referred to as a "first main surface") 1A, and further, multiple communicating holes 5 to communicate the peripheral groove 4 and the peripheral groove 2. In addition, the retaining rubber 6 is disposed in the second peripheral groove 4. The retaining rubber 6, the seal rubber 3 disposed in the first peripheral groove 2 and the bridge rubbers 7 disposed in the multiple communicating holes 5 are integrated to fix the seal rubber 3 to the metal body 1. In other words, the seal rubber 3, retaining rubber 6 and bridge rubbers 7 are integrally formed as a single rubber molded product as shown in FIG. 4.

In the seal of the present invention, the seal rubber 3 to be placed in the first peripheral groove 2 comprises a convex seal lip 3A on the entire circumference along its axis X1, wherein the convex seal lip 3A closely contacts the matching member.

In the seal of the present invention, as shown in seal 100 of the first embodiment, the first peripheral groove 2 has a dovetail groove Z, the second peripheral groove 4 has an inner surface inclined from the groove opening side to the groove bottom surface side (direction of arrow Y1 in FIG. 4) to reduce the groove width, and the width (D4-2) of the bottom of the second peripheral groove 4 is substantially the same as the inner diameter of the communicating hole (D3). To fill, with a rubber material R, almost the whole area of the first peripheral groove 2, the second peripheral groove 4 and the multiple communicating holes 5, which are designed to fulfill such particular groove shapes and size relations, the seal rubber 3, retaining rubber 6 and bridge rubber 7 are integrally formed from the rubber material R to give a single rubber molded product.

The seal rubber 3 is placed in the first peripheral groove 2 having the dovetail groove Z of the metal body 1 to fill almost the whole area of the groove. As a result, even when the seal of the present invention was attached to one member of the two openable-closable members (not shown), and the two members were kept in a closed state so long that the seal rubber became agglutinated to the matching member, once the two members are opened, the seal rubber can be separated from the matching member without being released from the first peripheral groove 2 having the dovetail groove Z. Even when a load from repeated open-close actions of the openable-closable members is applied, the rubber molded product does not become broken, and superior seal performance can be maintained for a long time.

Figure 6:
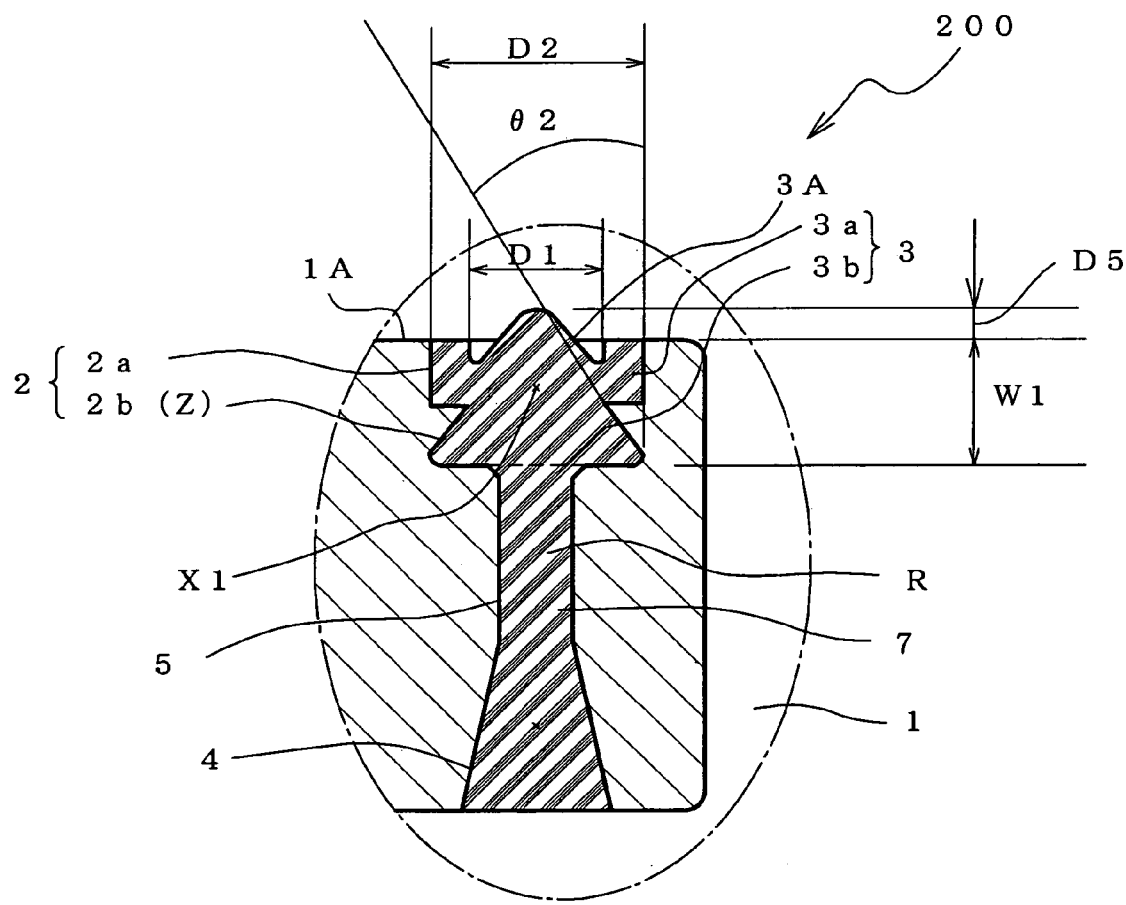
FIG. 6 is a sectional view of a substantial part of a seal of a second embodiment of the present invention.
Figure 7:
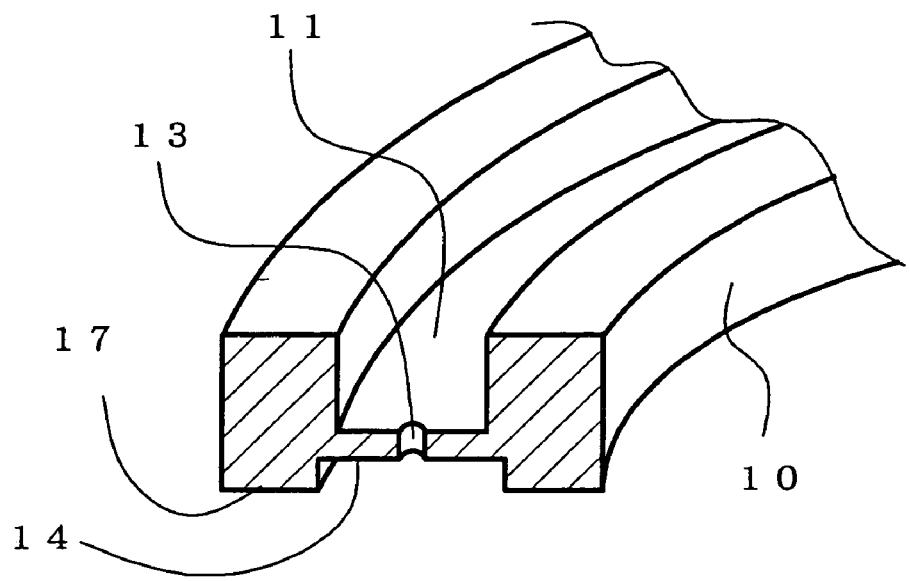
FIG. 7 is a perspective view containing a partial section of a retainer in a conventional seal.
Figure 8:
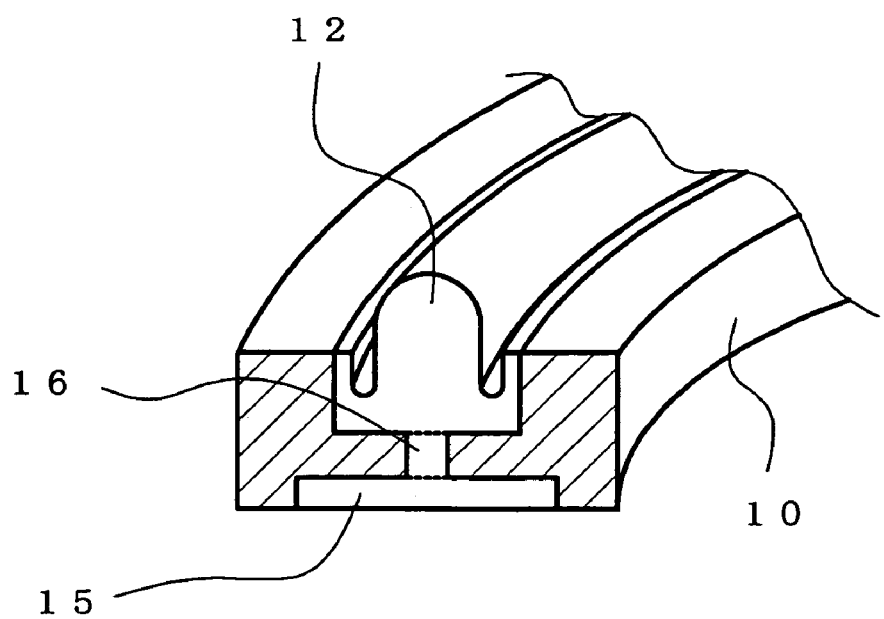
FIG. 8 is a perspective view containing a partial section of the conventional seal.
Figure 9:
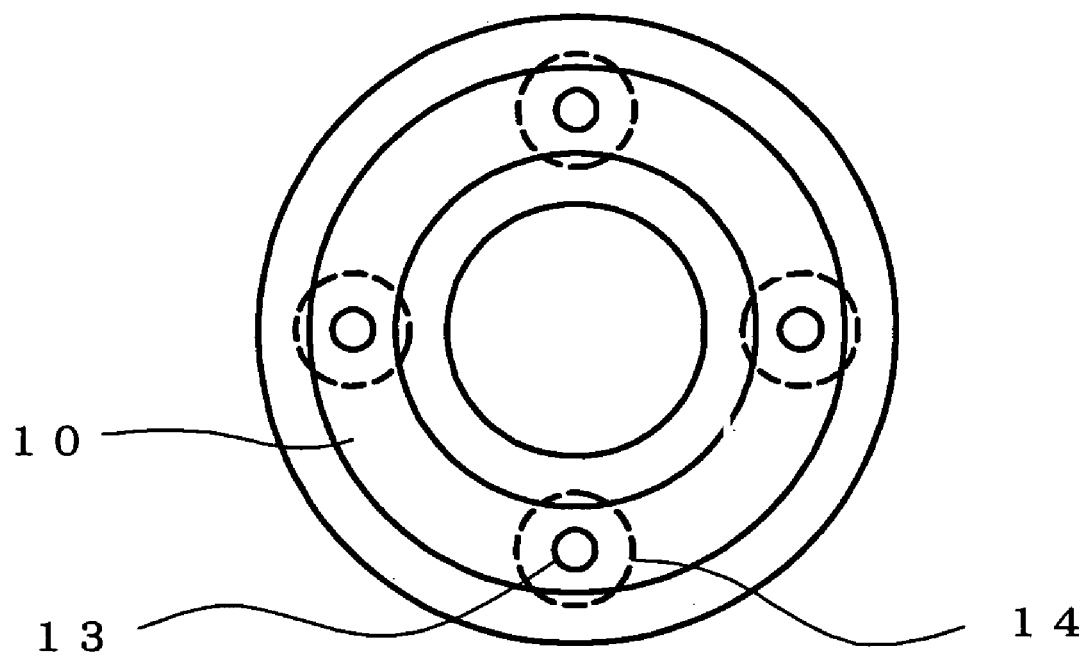
FIG. 9 is a plan view of a retaining rubber of the conventional seal.

FIG. 6 is a sectional view of the substantial part of a second embodiment of the seal of the present invention. In the seal 200 of the second embodiment, as shown in FIG. 6, the first peripheral groove 2 in which the seal rubber is placed is a two-tiered groove comprising a dovetail groove Z as a bottom groove portion 2b. In the same manner as in the seal 100 in the first embodiment, the rubber material R is filled in almost the whole area of the first peripheral groove 2, the second peripheral groove 4 and multiple communicating holes 5, and the seal rubber 3, retaining rubber 6 and bridge rubbers 7 are integrally formed as a single rubber molded product.

Therefore, in the seal rubber 3 filled in the first peripheral groove 2, a part 3b filled in the bottom dovetail groove Z (2b) becomes an anchor of a part 3a filled in a groove 2a on the opening side, and release of the seal rubber 3 from the first peripheral groove 2 or deformation thereof can be suppressed at a higher level. In addition, the depth of the whole groove can be made greater than a one-stage groove, by making the first peripheral groove 2 a two-tiered groove. A seal rubber 3 to be placed in the first peripheral groove 2 has superior elasticity and increases the adhesiveness of the seal rubber 3 to the matching member.

In the present invention, the first peripheral groove 2 in which the seal rubber 3 is placed, may be a two-tiered groove wherein both a groove 2a on the opening side and groove 2b on the bottom are dovetail grooves, or may be a multistage groove having three or more stages. By employing a two-tiered groove or multistage groove of three or more stages, wherein both grooves on the opening side and the bottom are dovetail grooves, the suppressive effect on the movement and deformation of seal rubber 3 in the first peripheral groove 2 can be further improved. In the case of a multistage groove having not less than 3 stages, at least the lowest bottom groove is a dovetail groove.

In the seal of the present invention, the thickness of the metal body (valve element) 1 is determined according to the use of the seal and the like. For example, when it is used as a gate seal for a chamber gate of semiconductor manufacturing equipment, liquid crystal manufacturing equipment or the like, the thickness (T) of the metal body (valve element) is generally 10-15 mm.

In addition, the opening width (D2) of the first peripheral groove 2 in the first main surface of the metal body 1 is determined according to the use of the seal and the like. For example, when it is used as a gate seal for a chamber gate of semiconductor manufacturing equipment, liquid crystal manufacturing equipment or the like, it is preferably about 5-8 mm, and the width (D1) of a seal lip 3A of seal rubber 3 is generally preferably within the range of 4-7 mm. Moreover, the amount of protrusion (D5) of the seal lip 3A from the first main surface 1a of the metal body 1 is generally preferably 0.5-2.0 mm.

In the seal of the present invention, the whole depth (W1) of the first peripheral groove 2 is preferably about 3-6 mm when the first peripheral groove 2 has one dovetail groove (the first embodiment shown in FIGS. 1-5), preferably about 5-8 mm when it consists of a two-tiered groove as shown in FIG. 6.

In the seal of the present invention, the bridge rubber 7 is generally a column having a given thickness, and cylindrical column, rectangular column and the like can be mentioned. Of these, a cylindrical column is particularly preferable because shrinkage of the bridge rubber 7 becomes isotropic, which advantageously reduces swelling (waving) of the seal lip of seal rubber 3.

While the thickness of the bridge rubber 7 (=inner diameter of communicating hole 5) (D3) is not particularly limited, it needs to have a thickness sufficient to prevent breakage of the bridge rubber when the seal lip 3A of seal rubber 3 is agglutinated with the matching member and they are separated.

While the thickness is determined depending on the number of communicating holes 5, strength of the rubber material to be used and the like, it is generally about 1-3 mm.

The thickness of the bridge rubber 7 (=inner diameter of communicating hole 5) (D3) means a diameter of its section (section perpendicular to the axis) when bridge rubber 7 is cylindrical, and a diameter of a circle assumed to have the same area as the section when bridge rubber 7 has a shape other than a cylindrical column such as rectangular column etc.

In the seal of the present invention, as mentioned above, it is essential that the second peripheral groove 4 to be formed in the second main surface 1B of the metal body 1 have an inner surface inclined to reduce the groove width from a groove opening side to a groove bottom surface side (direction of arrow Y1 in FIG. 4), and the groove width (D4-2) of the groove bottom surface of the second peripheral groove and the inner diameter (D3) of the communicating hole be substantially the same.

In the seal of the present invention, the seal rubber 3, retaining rubber 6 and bridge rubber 7 are integrally formed as a single rubber molded product. Generally, as mentioned below, they are formed by injecting a rubber material from the second peripheral groove 4 to the communicating hole 5 and to the first peripheral groove 2 from the second peripheral groove 4 formed on the other main surface 1B of the metal body 1 as an inlet, until it fills almost all areas in the inside of these three members, and molding the rubber material. Because the second peripheral groove 4 has an inner surface inclined to reduce the groove width from a groove opening side to a groove bottom surface side (direction of arrow Y1 in FIG. 4), and the groove width (D4-2) of the groove bottom surface of the second peripheral groove and the inner diameter (D3) of the communicating hole are substantially the same, the rubber material flows at a stable pressure from the second peripheral groove 4 to the first peripheral groove 2. As a result, even when the first peripheral groove 2 is a groove having a dovetail groove, a constitution wherein the seal rubber 3 is placed to fill almost the whole area of the first peripheral groove 2 can be certainly obtained.

The groove width (D4-1) of the opening of peripheral groove 4 of the second peripheral groove 2 is determined based on the groove width (D4-2) of the groove bottom surface and is preferably so determined that the angle of inclination ($\theta 3$ in FIG. 4) of the side surface of the groove will be within the range of 1-10°.

In the seal of the present invention, the formation pitch of the bridge rubber 7 (i.e., formation pitch of communicating hole 5) to be integrated with the seal rubber 3 and retaining rubber 6 is determined in consideration of the material, outer diameter (=inner diameter of communicating hole 5) of bridge rubber 7 and the like. It is generally about 10-15 mm. The formation pitch of the bridge rubber 7 (=formation pitch of communicating hole 5) here means the distance between the axes of the neighboring bridge rubbers 7 in the direction of axis X1 of seal rubber 3.

In the seal of the present invention, the angle of inclination ($\theta 1$ in FIG. 4, $\theta 2$ in FIG. 6) of the side surface of the dovetail groove Z is generally 10-24°.

In the seal of the present invention, as seal 100 in the above-mentioned first embodiment (FIGS. 1-5), when the main surfaces 1A, 1B of the metal body 1 are planes having shapes including linear sides and curved sides, such as a shape wherein four corners of a rectangle have been replaced by curves, a shape wherein four corners of a square have been replaced by curves or the like, the first peripheral groove 2 and the second peripheral groove 4 to be formed on the main surfaces 1A, 1B of the metal body 1 each consist of linear groove parts 2A, 4A along the linear side and curved groove parts 2B, 4B along the curved side. When the peripheral groove to be formed on the main surface of such metal body 1 is a peripheral groove having a linear groove part and a curved groove part, the formation pitch of the communicating hole 5 communicating with the linear groove parts 2A, 4A on the main surfaces 1A, 1B of the metal body is preferably made smaller than that of the communicating hole 5 communicating with the curved grooves 2B, 4B, from the aspects of the workability of removing seal rubber 3 from the metal body 1.

In the seal of the present invention, the size of an approximately flat-plate-shaped metal body (valve element) 1 (size of main surface) is appropriately determined depending on the specific use of the seal.

In the seal of the present invention, as constituent material of an approximately flat-plate-shaped metal body (valve element) 1, for example, iron, aluminum, aluminum alloy, stainless (SUS), steel (carbon steel, special steel) and the like can be mentioned. Of these, aluminum and aluminum alloy are preferable because they are light and recyclable. When using them, a surface hardening treatment (alumite treatment) is preferable. In addition, SUS etc. are preferable from the aspect of being rust proof. In the seals of the aforementioned specific examples, the main surface of the metal body 1 has a shape wherein four corners of a rectangle are replaced by curves. Besides this shape, for example, a quadrangle other than a rectangle (e.g., square etc.) (including shapes wherein four corners are replaced by curves), a polygon other than a quadrangle (including shapes wherein 3 or 5 or more corners are replaced by curves), a circle, an oval, an ellipse and the like can be mentioned.

In the seal of the present invention, as a material constituting the seal rubber, known rubber materials employed for seals can be used. Of these, fluorine rubber, silicone rubber and a rubber difficult to be adhered via an adhesive (e.g., perfluoroelastomer) are preferable.

The seal of the present invention is particularly preferable as a seal (gate seal) to be applied to a chamber gate part of semiconductor manufacturing equipment, a liquid crystal manufacturing equipment and the like, i.e., an open/close part (valve element and valve seat) of a chamber. When used for a gate seal, fluorine rubber materials are particularly preferable from the aspect of resistance to oxygen plasma. Of these, a fluorine rubber composition obtained by polyol vulcanization of a composition comprising 30-100 parts by weight of barium sulfate per 100 parts by weight of fluorovinylidene-hexafluoropropylene copolymer and/or fluorovinylidene-hexafluoropropylene-tetrafluoroethylene copolymer, and a fluorine rubber composition obtained by further adding 0.5-30 parts by weight of a tetrafluoroethylene resin to the above composition are particularly preferable. As the polyol vulcanizing agent, known ones can be used, for example, bisphenol AF.

The polyol vulcanizing agent may be added in 0.5-5 parts by weight, preferably 1-2 parts by weight, per 100 parts by weight of the copolymer. As the promoter and acid acceptor, quaternary phosphonium salt, quaternary ammonium salt, calcium hydroxide, magnesium oxide and the like are used. When the amount of tetrafluoroethylene resin to be added is less than 0.5 part by weight, an improving effect on the oxygen plasma resistance is small, and when it exceeds 30 parts by weight, mechanical properties such as tensile strength, elongation and the like tend to be degraded. Thus, a preferable amount of addition is 1-20 parts by weight.

The rubber material may contain a filler, and as the filler, carbon-black; oxides such as silica, titanium oxide, lead oxide, zinc oxide, magnesium oxide, diatomaceous earth, alumina, calcium oxide, iron oxide, tin oxide, antimony oxide, ferrites and the like; hydroxides such as magnesium hydroxide, aluminum hydroxide, calcium hydroxide and the like; carbonates such as basic magnesium carbonate, calcium carbonate, barium carbonate, magnesium carbonate, zinc carbonate, dawsonite, hydrotalcite and the like; sulfates such as barium sulfate, calcium sulfate and the like; silicates such as aluminum silicate (clay, kaolinite, pyrophylite), magnesium silicate (talc), calcium silicate (wollastonite, zonotlite), clay, montmorillonite, bentonite, activated clay and mica and the like; nitrides such as aluminum nitride, boron nitride, silicon nitride and the like can be mentioned. One or more kinds of these can be used in combination.

The seal of the present invention is preferably produced by disposing a metal body (valve element) 1 in a metal mold, wherein the metal body comprises the first peripheral groove 2, the second peripheral groove 4 and the communicating hole 5, in a metal mold, injecting a rubber material from the second peripheral groove on the other main surface of the metal body (valve element) 1 into the communicating hole 5 and the first peripheral groove 2 and forming a single rubber molded product (rubber member) containing seal rubber 3, retaining rubber 6 and bridge rubber 7.

As for the above-mentioned rubber material, additives such as crosslinking agent (vulcanization agent), filler etc. are added to a rubber and/or an elastomer, which are base components, and mixed by a known mixing (kneading) method such as roll mixing, kneader mixing, Banbury mixing etc. to give a composition for molding, which composition is injected into the second peripheral groove 4, the communicating hole 5 and the first peripheral groove 2 from the second peripheral groove 4 as an inlet. The polymer (rubber and/or elastomer) is crosslinked (primary crosslinking (vulcanization)) in this molding process. Further crosslinking (secondary crosslinking (vulcanization)) may be applied after molding. The molding conditions etc. can follow those of known apparatus and conditions for the molding material made of this kind of rubber and/or elastomer.

This application is based on a patent application No. 2004-282303 filed in Japan, the contents of which are hereby incorporated by reference.

What is claimed is:

1. A seal having a seal rubber, which seal is to be set on one of two openable-closable members to hermetically seal a gap between the two members with the seal rubber pressed against the other member when the two members are closed, the seal comprising:
    an approximately flat-plate-shaped metal body having first and second oppositely-facing main surfaces, said metal body comprising a first peripheral groove in said first main surface thereof and a seal rubber therein, a second peripheral groove in said second main surface thereof, and multiple communicating holes to communicate said second peripheral groove and said first peripheral groove;
    wherein said second peripheral groove has a retaining rubber disposed therein, said retaining rubber and said seal rubber being integrated with bridge rubbers disposed in said multiple communicating holes;
    wherein said first peripheral groove is a dovetail groove;
    wherein said second peripheral groove has an inner surface inclined at an angle in a range of 1-10° to reduce the groove width from a groove opening side to a groove bottom surface side, the groove width of the groove bottom surface and an inner diameter of each of said communicating holes are substantially the same; and
    wherein said seal rubber is mounted in said first peripheral groove to fill almost the whole area of said first peripheral groove.

2. The seal of claim 1, wherein said dovetail groove has a trapezoidal cross sectional shape.

3. The seal of claim 1, wherein said seal rubber, said retaining rubber and said bridge rubbers are integrally formed as a molded product made of a single rubber by injecting a rubber material to said second peripheral groove, said communicating holes and said first peripheral groove from said second peripheral groove of said metal body as an inlet.

4. The seal of claim 1, wherein said seal rubber, said retaining rubber and said bridge rubbers are made of a fluorine rubber material.

5. The seal of claim 1, wherein each of said first and second main surfaces of said approximately flat-plate-shaped metal body has a shape of a rectangle or square having four curved corners, said first and said second peripheral grooves each comprise a linear groove along a linear side of the respective one of said first and second main surfaces of said metal body, and a curved groove along a curved side thereof, and a formation pitch of said communicating holes to communicate said linear grooves of said first and said second peripheral grooves is smaller than a formation pitch of said communicating holes to communicate said curved grooves of said first and said second peripheral grooves.

6. The seal of claim 1, which is used as a gate seal in a chamber gate for semiconductor manufacturing equipment and liquid crystal manufacturing equipment.

7. A seal having a seal rubber, which seal is to be set on one of two openable-closable members to hermetically seal a gap between the two members with the seal rubber pressed against the other member when the two members are closed, the seal comprising:
    an approximately flat-plate-shaped metal body having first and second oppositely-facing surfaces, said metal body comprising a first peripheral groove in said first main surface thereof and a seal rubber therein, a second peripheral groove in said second main surface thereof, and multiple communicating holes to communicate said second peripheral groove and said first peripheral groove,
    wherein said second peripheral groove has a retaining rubber disposed therein, said retaining rubber and said seal rubber being integrated with bridge rubbers disposed in said multiple communicating holes,
    wherein said first peripheral groove is a multistage groove comprising a dovetail groove at least as a lowest bottom groove part;
    wherein the second peripheral groove has an inner surface inclined to reduce the groove width from a groove opening side to a groove bottom surface side, the groove width of the groove bottom surface and the inner diameter of each of said communicating holes are substantially the same; and
    wherein said seal rubber is mounted in said first peripheral groove to fill almost the whole area of said first peripheral groove.

8. The seal of claim 7, wherein said multistage groove is a two-tiered groove.

9. The seal of claim 8, wherein said two-tiered groove is a dovetail groove.

* * * * *